(12) United States Patent
Heath

(10) Patent No.: US 8,196,623 B1
(45) Date of Patent: Jun. 12, 2012

(54) STUMP GRINDER

(75) Inventor: David Heath, Montgomery, AL (US)

(73) Assignee: David Duane Heath, Montgomery, TX (US)

( * ) Notice: Subject to any disclaimer, the term of this patent is extended or adjusted under 35 U.S.C. 154(b) by 486 days.

(21) Appl. No.: 11/741,701

(22) Filed: Apr. 27, 2007

(51) Int. Cl.
*A01G 23/06* (2006.01)

(52) U.S. Cl. .................. 144/24.12; 144/235; 144/237; 241/292.1

(58) Field of Classification Search ............. 144/24.12, 144/218, 231–235, 237, 172, 334; 241/292.1, 241/293, 296
See application file for complete search history.

(56) References Cited

U.S. PATENT DOCUMENTS

| | | |
|---|---|---|
| 336,661 A | 2/1886 | Peck |
| 346,681 A | 8/1886 | Perry |
| 578,234 A | 3/1897 | Gutenkunst |
| 2,927,613 A | 3/1960 | Franzen et al. |
| 3,198,224 A | 8/1965 | Hiley |
| 3,308,860 A | 3/1967 | De Shano |
| 3,336,958 A | 8/1967 | Carlton |
| RE28,651 E | 12/1975 | Welborn |
| 4,041,996 A | 8/1977 | Grover |
| 4,271,879 A | 6/1981 | Shivers, Jr. et al. |
| 4,703,786 A | 11/1987 | Doskocil |
| 4,785,860 A * | 11/1988 | Arasmith ............... 144/174 |
| 4,958,775 A * | 9/1990 | Arasmith ............... 241/88.1 |
| 5,005,619 A * | 4/1991 | Jensen ............... 144/230 |
| 5,419,380 A * | 5/1995 | Bot ............... 144/334 |
| 6,021,825 A | 2/2000 | Bowling |
| 6,305,445 B1 | 10/2001 | Falatok |
| 6,484,766 B1 | 11/2002 | Falatok et al. |
| 6,708,743 B2 | 3/2004 | Ziehm |
| 7,096,900 B2 * | 8/2006 | Schafer ............... 144/4.1 |
| 7,150,300 B1 * | 12/2006 | Peterson ............... 144/24.12 |

FOREIGN PATENT DOCUMENTS

| | | |
|---|---|---|
| DE | 3318315 | 11/1984 |
| DE | 4218069 | 12/1993 |
| EP | 01.556.096 | 8/2005 |
| GB | 105.828 | 11/1922 |
| GB | 1.139.679 | 1/1969 |
| GB | 1.248.360 | 9/1971 |

* cited by examiner

*Primary Examiner* — Shelley Self

(57) ABSTRACT

A stump grinder having a grinding member with a plurality of stacked plates. The stacked plates are joined by at least three bolts that extend the entire length of the plate stack and are secured by nuts at each end thereof. Adjacent plates are held apart from each other via spacers. Each spacer has a aperture through which one of the bolts passes. Each plate has three cutting elements secured thereon. The three cutting elements are spaced at approximately one hundred-twenty degrees apart from an adjacent cutting element. The three cutting blades are each mounted to have a different cutting path. To this end one of the blades is mounted on a first surface of the plate. The second blade is mounted on a second opposed surface of the plate and the third blade is mounted intermediate the first and second blades. The cutting paths may slightly overlap to ensure that now material is left uncut. The plates are mounted on a driven shaft.

18 Claims, 10 Drawing Sheets

STUMP GRINDER

BACKGROUND OF THE INVENTION

1. Field of the Invention

Figure 1:
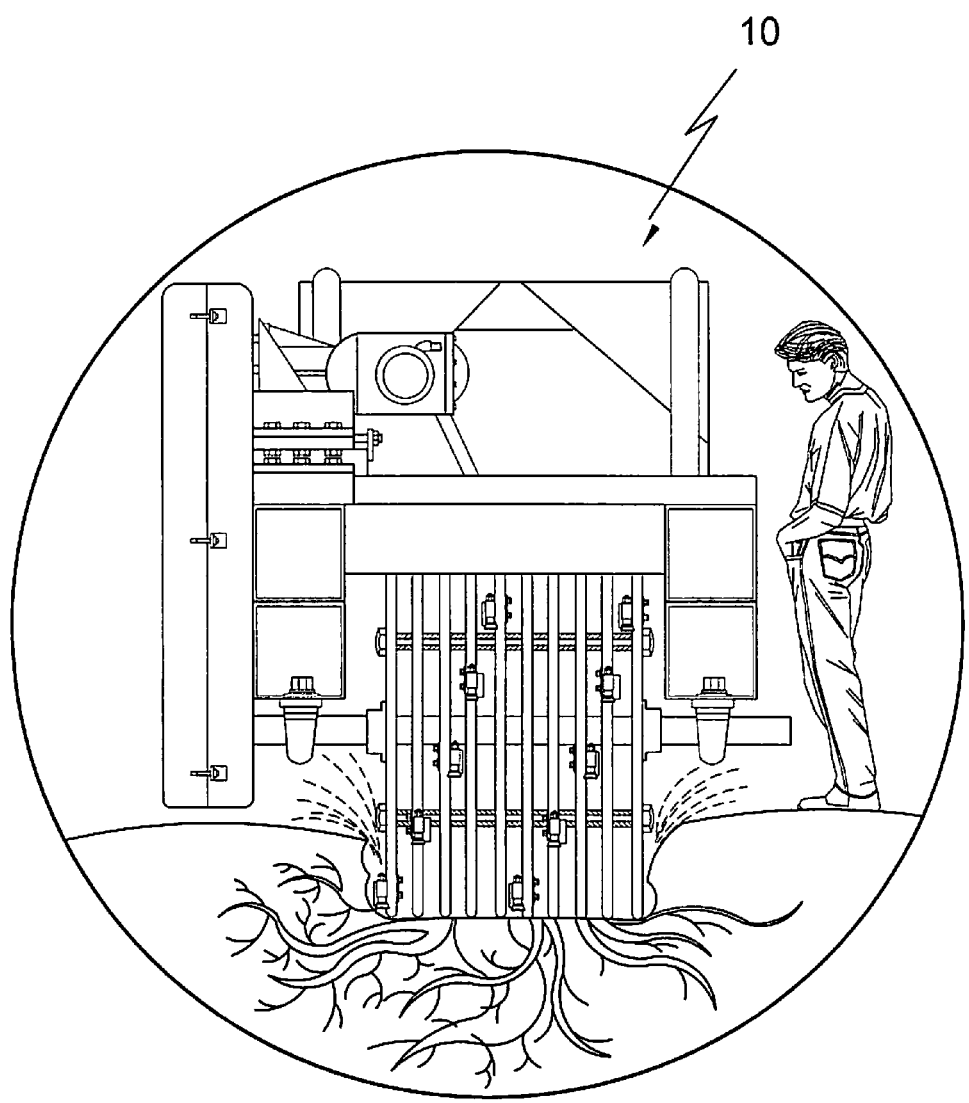

The present invention relates generally to stump removal and, more specifically, to a stump grinder having a plurality of spaced plates having carbide cutting elements attached to the their periphery that when in use is capable of cutting a tree down and grinding away the stump well below ground level. The device is powered utilizing a power take off (PTO) type device having a double roller chain, sprockets and a gearbox utilized for turning a drive shaft attached to said plates. Additionally said plates are spaced at intervals to reduce drag during a grinding operation and may be utilized and integrated with tractors of a lower horsepower.

2. Description of the Prior Art

There are other stump grinding devices designed for removing stumps. Typical of these is U.S. Pat. No. 336,661 issued to Peck on Feb. 23, 1886.

Another patent was issued to Perry on Aug. 3, 1886 as U.S. Pat. No. 346,681. Yet another U.S. Pat. No. 578,234 was issued to Gutenkunst on Mar. 2, 1897 and still yet another was issued on Mar. 8, 1960 to Franzen et al as U.S. Pat. No. 2,927,613.

Another patent was issued to Hiley on Aug. 3, 1965 as U.S. Pat. No. 3,198,224. Yet another U.S. Pat. No. 3,308,860 was issued to De Shano on Mar. 14, 1967. Another was issued to Carlton on Aug. 22, 1967 as U.S. Pat. No. 3,336,958 and still yet another was issued on Dec. 16, 1975 to Welborn as U.S. Pat. No. RE28,651.

Another patent was issued to Grover on Aug. 16, 1977 as U.S. Pat. No. 4,041,996. Yet another U.S. Pat. No. 4,271,879 was issued to Shivers, Jr. et al. on Jun. 9, 1981. Another was issued to Doskocil on Nov. 3, 1987 as U.S. Pat. No. 4,703,786 and still yet another was issued on Feb. 8, 2000 to Bowling as U.S. Pat. No. 6,021,825.

Another patent was issued to Falatok on Oct. 23, 2001 as U.S. Pat. No. 6,305,445. Yet another U.S. Pat. No. 6,484,766 was issued to Falatok et al. on Nov. 26, 2002. Another was issued to Ziehm on Mar. 23, 2004 as U.S. Pat. No. 6,708,743.

Another patent was issued to Bomford, et al. on Apr. 12, 1923 as U.K. Patent No. GB 195,828. Yet another U.K. Patent No. GB 1,139,679 was issued to Powell on Jan. 8, 1969. Another was issued to Wayne Manufacturing Co. on Sep. 29, 1971 as U.K. Patent No. GB 1,248,360 and still yet another was issued on Nov. 22, 1984 to Bellars as German Patent No. DE3318315.

Another patent was issued to Hagedorn on Dec. 2, 1993 as German Patent No. DE 4218069. Yet another European Patent Application No. EP 1,566,096 was published to Watts on Aug. 24, 2005.

U.S. Pat. No. 336,661

Inventor: T. W. Peck

Issued: Feb. 23, 1886

In combination, with a saw-arbor, a collar secured thereupon, pins projecting from said collar parallel with the arbor, a saw, a collar mounted upon the latter, provided with holes to receive the arbor and pins, and a second collar separate from the saw, also mounted upon the arbor, to receive the ends of the pins, and provided with a set-screw.

U.S. Pat. No. 346,681

Inventor: J. L. Perry

Issued: Aug. 3, 1886

An improved abrading-cylinder consisting of an arbor or shaft, and a series of rings or sections secured thereon, and a series of separate cutting-teeth secured removably upon said rings or sections by bolts passing through the teeth and rings, substantially as described, the said teeth forming a continuous spiral upon the cylinder; for the purpose stated.

U.S. Pat. No. 578,234

Inventor: W. Gutenkunst

Issued: Mar. 2, 1897

In a fodder-shredder, a series of toothholding disks each formed with teeth-retaining recesses of unequal depths in each side, whereby the teeth are held in a position with their planes of rotation in juxtaposition; said disks being also provided with projections D adapted to interlock in the deeper recesses of the adjacent plates, whereby the teeth of the respective disks are held in place and the disks are made to support each other against the annular strain, substantially as described.

U.S. Pat. No. 2,927,613

Inventor: F. L. Franzen et al.

Issued: Mar. 8, 1960

A stump removing machine adapted for connection to a tractor having a power take-off and a hydraulic pump, comprising a first frame adapted to be mounted rigidly on the tractor and to extend in the direction of movement of the tractor, a second frame adapted to extend in the direction of movement of the tractor, a first universal joint interconnecting said first and second frames for universal movement therebetween, an auxiliary frame slidably mounted on said second frame, a rotating cutting disk having a cutting tooth thereon mounted on said auxiliary frame with said disk in a substantially vertical plane, means for interconnecting the power take-off from the tractor and said disk for rotating said disk in said plane and including a second universal joint interconnecting adjacent shaft sections, first hydraulic motor means for causing relative movement of said second frame with respect to said first frame is a horizontal direction, second hydraulic motor means for causing movement of said second frame with respect to said first frame in a vertical direction, third hydraulic motor means interconnecting said second frame and said auxiliary frame to adjust the position of said auxiliary frame in a longitudinal direction along said second frame, and manual control means separate from said means for rotating the cutting disk for operating said hydraulic motor means, whereby to adjust the position of said cutting disk in a longitudinal direction along said second frame and to adjust the position of said second frame with respect to said first frame and thereby to adjust the position of said disk cutting tooth with relation to a stump.

U.S. Pat. No. 3,198,224

Inventor: A. R. Hiley

Issued: Aug. 3, 1965

A stump removing machine adapted for connection to a tractor having a power take-off and a hydraulic pump, comprising a first frame adapted to be mounted rigidly on the tractor and to extend in the direction of movement of the tractor, a second frame adapted to extend in the direction of movement of the tractor, a first universal joint interconnecting said first and second frames for universal movement therebetween, an auxiliary frame slidably mounted on said second frame, a rotating cutting disk having a cutting tooth thereon mounted on said auxiliary frame with said disk in a substantially vertical plane, means for interconnecting the power take-off from the tractor and said disk for rotating said disk in said plane and including a second universal joint interconnecting adjacent shaft sections, first hydraulic motor means for causing relative movement of said second frame with respect to said first frame is a horizontal direction, second hydraulic motor means for causing movement of said second frame with respect to said first frame in a vertical direction, third hydraulic motor means interconnecting said second frame and said auxiliary frame to adjust the position of said auxiliary frame in a longitudinal direction along said second frame, and manual control means separate from said means for rotating the cutting disk for operating said hydraulic motor means, whereby to adjust the position of said cutting disk in a longitudinal direction along said second frame and to adjust the position of said second frame with respect to said first frame and thereby to adjust the position of said disk cutting tooth with relation to a stump.

U.S. Pat. No. 3,308,860

Inventor: A. D. De Shano

Issued: Mar. 14, 1967

A stump cutter comprising in combination: an elongate chassis having a forward end, a rear end, and spaced wheels supporting the forward end above ground level; a power driven stump cutting tool; frame means shiftably supported upon the chassis for forward and rearward movement thereon, an engine mounted upon said frame means, means connecting said engine to said stump cutting tool for powering said tool, said frame means having a forward end supporting the cutting tool; and means for shifting said frame means to elevate and lower the cutting tool, and to traverse said tool both longitudinally and laterally of the chassis across the stump.

U.S. Pat. No. 3,336,958

Inventor: J. P. Carlton

Issued: Aug. 22, 1967

A stump removing machine adapted for connection to a tractor having a power take-off and a hydraulic pump, comprising a first frame adapted to be mounted rigidly on the tractor and to extend in the direction of movement of the tractor, a second frame adapted to extend in the direction of movement of the tractor, a first universal joint interconnecting said first and second frames for universal movement therebetween, an auxiliary frame slidably mounted on said second frame, a rotating cutting disk having a cutting tooth thereon mounted on said auxiliary frame with said disk in a substantially vertical plane, means for interconnecting the power take-off from the tractor and said disk for rotating said disk in said plane and including a second universal joint interconnecting adjacent shaft sections, first hydraulic motor means for causing relative movement of said second frame with respect to said first frame is a horizontal direction, second hydraulic motor means for causing movement of said second frame with respect to said first frame in a vertical direction, third hydraulic motor means interconnecting said second frame and said auxiliary frame to adjust the position of said auxiliary frame in a longitudinal direction along said second frame, and manual control means separate from said means for rotating the cutting disk for operating said hydraulic motor means, whereby to adjust the position of said cutting disk in a longitudinal direction along said second frame and to adjust the position of said second frame with respect to said first frame and thereby to adjust the position of said disk cutting tooth with relation to a stump U.S. Pat. No. RE28,651

Inventor: Robert E. Welborn

Issued: Dec. 16, 1975

A vehicle mounted stump removal machine employs a cutter carrying boom mounted for lateral swinging above the vehicle wheels, the boom being carried by a cradle or supporting structure mounted for oscillation about the vehicle wheel axis to control the operating depth of the cutter.

U.S. Pat. No. 4,041,996

Inventor: Ross D. Grover

Issued: Aug. 16, 1977

Apparatus for eradicating tree stumps comprising a rotary cylinder or drum having knives or cutters around its periphery. The cutters are mounted on rings which encircle the drum. The rings have circumferentially spaced mounting surfaces which are staggered relative to one another so that the cutters when secured to the mounting surfaces are themselves staggered for more effective cutting action. The drum is supported by two rotary hydraulic and/or electric motors having aligned output shafts which are connected to the ends of the drum to support and also to rotate it. The motors are carried by the arms of a yoke. Instead of two motors, there may be a motor at one end of the drum and a bearing at the other.

U.S. Pat. No. 4,271,879

Inventor: Shivers Jr. et al.

Issued: Jun. 9, 1981

A hydraulic stump cutting and earth digging apparatus including a balanced main supporting frame of a vehicle member and an adjustable telescopic channel frame cutter boom, the boom comprising a forward centrally disposed rotatable cutting wheel having a plurality of radially extending cutting teeth circumferentially mounted thereon. The channel frame cutter boom further includes a hydraulic motor contiguously mounted with the cutting wheel and having a common axis for rotation. A double pump and motor for circulation of hydraulic fluid to the hydraulic components of the apparatus is mounted on the main supporting frame thereby providing a telescopic cutter boom which is lighter in weight and more accessible to tighter places than conventional hydraulic stump cutters. In one embodied form the adjustable telescopic channel frame cutter boom is provided with flexible sideflaps which permits the removal of tree stumps situated close to permanent obstructions yet provides an effective means for controlling cut material through the channel frame of the boom.

U.S. Pat. No. 4,703,386

Inventor: David L. Doskocil

Issued: Nov. 3, 1987

An improved stump grinding apparatus wherein the design and location of the components encourage the operator to stay at the handles, which are located away from the cutting wheel while it is rotating. The cutting wheel rotates whenever the engine is running, and, because the apparatus is supported by a pair of tires and its weight is balanced slightly forward of the tires (the end with the cutting wheel), the rotating cutting wheel will fall to the ground whenever the operator lets go of the handles. Further, because the underside of the cutting wheel is exposed at all times, if the operator releases the handles without first stopping the engine, the cutting wheel will dig into the ground. The apparatus also has an angular side chute aft of the cutting wheel which deflects wood chips from the stump being ground to the side of the apparatus.

U.S. Pat. No. 6,021,825

Inventor: John M. Bowling

Issued: Feb. 8, 2000

A stump cutting apparatus for connection to an excavator or other prime mover for conveyance in any ground breaking or farm industry. The stump cutter apparatus comprises a chassis for supporting for supporting stump cutter, a cutting assembly, an engine for providing power to the cutting assembly, an attachment member for releasably attaching the stump cutter to an excavator or other prime movers. The chassis may include one or more support legs or in the alternative one or more wheels to allow for support and easy movement of the apparatus. The cutting assembly comprises of support legs, which comprises one or more spikes extending downward to be able to be received by the surface to enable the apparatus to be secure during stump cutting operation. The stump cutting apparatus also has several hydraulic cylinders for supporting the stump cutter by retracting and extending the members of the apparatus and enable to cutter wheel to move to meet the objective of user for cutting stumps and roots.

U.S. Pat. No. 6,305,445

Inventor: Daniel R. Falatok

Issued: Oct. 23, 2001

An improved stump grinding machine includes a frame structure having an engine mounted thereon. A boom has a proximal end and distal end and is pivotally mounted to the frame structure at its proximal end. A grinding wheel is rotatably mounted to the distal end of the boom. A power train arrangement transmits power from the engine to the grinding wheel. The power train arrangement includes an idler shaft rotatably mounted on the frame structure. The boom is pivotally mounted to the frame structure independently of the idler shaft.

U.S. Pat. No. 6,484,366

Inventor: Daniel R. Falatok

Issued: Nov. 26, 2002

A stump grinding wheel includes a wheel member having a plurality of receiving brackets. Each receiving bracket includes a cutting tool channel. A cutting tool is received in each of cutting tool channel. Each cutting tool includes an elongated shaft having a base end and a distal end, and a cutting tip at the distal end. A stop is defined on the elongated shaft between the base end and the distal end and is configured so that it permits gauging of the distance between each receiving bracket and a respective cutting tip.

U.S. Pat. No. 6,308,743

Inventor: Robert P. Ziehm

Issued: Mar. 23, 2004

A stump-grinding apparatus includes a block having an inner surface and an outer surface. The inner surface is adjacent to a side of the wheel between the center of wheel and the peripheral edge. The outer surface defines both a groove and a first aperture in the groove. A tooth is received into the groove. The tooth has a first end and a second end spaced from the first end. The second end defines a second aperture that can align with the first aperture. A fastener extends through the first and second aperture to fasten the tooth to the block.

British Patent Number GB195,828

Inventor: Raymond Douglas Bomford

Issued: Apr. 12, 1923

Bomford, D. R., and Bomford, L. R. Feb. 17, 1922. Single-tool and rotary-tool implements; tools, construction of.—A machine for uprooting the stumps of trees, bushes, &c. comprises a frame B carrying a rotatable drum M provided with four pairs of tines N. The drum is formed with recesses P in which one or more pawls H, operated by a hand lever E, are adapted to engage. In operation the machine, which is supported at its fore end on wheels C, is caused to travel over the ground with the drum locked by the pawl H. When a root is engaged between the pair of tines which are being dragged through the soil, it is raised and, on freeing the drum by lifting the pawl, left behind on the surface of the soil.

British Patent Number GB 1139679

Inventor: Edward Powell

Issued: Jan. 8, 1969

1,139,679. Woodworking. E. POWELL. 21 Sep. 1967[21 Jun. 1966], No. 27714/66. Heading B5L. Apparatus for clearing tree stumps and/or roots of felled trees comprises a rotary cutter or cutters 7 carried by supporting means comprising a swingable articulated arm structure operable to permit the cutter or cutters to be moved to demolish the stumps or roots by cutting. The arm structure consists of an arm 1 at one end connected by a pivot 13 to a turret 14 rotatable about a vertical axis, and at the other end connected by a pivot 6 to an arm 2 carrying at its outer end a cutter comprising a pair of spaced discs 7 mounting replaceable cutters 8. The cutter is driven by a chain 11 from an hydraulic motor 10, and hydraulic rams 15, 22 are provided for raising and lowering the cutter and for extending and withdrawing the arms 1, 2. A further hydraulic motor is provided to rotate the turret. The apparatus may be mounted on the platform 29 of a vehicle and operated pneumatically, electrically or mechanically instead of hydraulically.

British Patent Number GB 1248360

Inventor: Wayne Manufacturing Co.

Issued: Sep. 29, 1971

In a tree stump removing machine rotary cutters 21 are moved in three dimensions to disintegrate a stump 22. In the machine a draft frame 11, connectable to a pulling vehicle at 12, is mounted on spaced axially aligned wheels 10 and may be stabilized by jack 13. A carriage 15 mounted above the wheels is pivoted to this frame to give rotation about a lateral axis, preferably wheel axis 16. A boom 14 is pivoted to the carriage forward of the wheel axis at 42 so that the rear of the boom may swing from side to side and is supported throughout its swing by suitable means 54. Two arms mounting rotary cutters 21 depend from and are pivoted to the beam at 24 so that the cutters may swing back and forth. An engine 17 mounted on the beam drives the rotary cutters via a belt 34 and a chain 30. It may also drive an hydraulic pump 20 connected via controls C to operate actuators 28, 50 and 57, these actuators causing the previously described movements of the cutting head, beam and carriage respectively.

German Patent Number DE3318315

Inventor: Bellars Terance George

Issued: Nov. 22, 1984

The rotating cutter device to be attached to a tractor is for the comminution of tree stumps down to a certain distance below the surface of the ground. The cutter disc of the device is driven by a hydraulic motor via a flexible coupling. The hydraulic motor is driven by a hydraulic power source which is operated by the engine of the tractor. Preferably a freewheel device is provided which makes it possible for the cutter disc to continue to revolve when the tractor engine is allowed to run more slowly. The cutter disc preferably has cutter elements which are attached to it by means of bolts or the like and which extend through a portion of the disc into threaded holes, cooperating with the bolts, in the cutter elements.

German Patent Number DE4218069

Inventor: Hagedorn Helmut

Issued: Dec. 2, 1993

The lift (11) has two telescopable guide bars, arranged vertically displaceably to one another, which are pivotably located on two static horizontal shafts (15, 16). With their opposing ends the bars are linked to one another rotatably and vertically on the work machine. By pivoting the work machine (12) by operation of one of the guide bars (13, 14) from the lower work position to the upper transport position the length of the upper guide bar is shortened and that of the lower guide bar (14) is extended.

European Patent Number EP1,566,096

Inventor: Multi-tip Designs

Issued: Nov. 2, 2004

A grinding unit for use with a grinding machine (100) is provided. The grinding unit comprises a rotor (20) which has a rim (23) around which a plurality of slots (24) are provided. Each of the slots in the rotor engages in use with one of a plurality of teeth (30). The teeth are retained in the rotor by a fixing means (27,28).

While these stump grinders may be suitable for the purposes for which they were designed, they would not be as suitable for the purposes of the present invention, as hereinafter described.

SUMMARY OF THE PRESENT INVENTION

A primary object of the present invention is to provide a stump grinder having a plurality of steel plates driven by a Power Take Off (PTO) source having a plurality of carbide cutting elements attached thereto the periphery of each plate for grinding and mulching of tree stumps well below ground level.

Another object of the present invention is to provide a stump grinder having a double row drive chain, a gearbox, and a clutch to drive the device.

Yet another object of the present invention is to provide a stump grinder capable of cutting down trees and grinding the stump.

Still yet another object of the present invention is to provide a stump grinder capable of being driven by low horsepower tractors.

Another object of the present invention is to provide a stump grinder having evenly spaced plates to prevent drag while cutting or mulching.

Yet another object of the present invention is to provide a stump grinder whereby a plurality of spaced plates are connected or joined in a stack by three through bolts spaced approximately one hundred-twenty degrees apart, where the stack bolts are secured at each end by a nut.

Still yet another object of the present invention is to provide a stump grinder having a drive train that when powered by a power take off is capable of rotating the grinding member that has a plurality of spaced plates having cutting elements secured thereon.

Additional objects of the present invention will appear as the description proceeds.

The present invention overcomes the shortcomings of the prior art by providing a stump grinder having a plurality of evenly spaced plates with cutting elements secured about the periphery of each plate where a tractor having a PTO based power system is capable of powering the stump grinder. The stump grinder has a drive train utilizing a double row drive chain, double sprockets, a gearbox, and may include a clutch to turn the grinding member. Additionally the present invention may be mounted on or pulled behind a lower horsepower tractor and is capable of cutting a tree and grinding the remaining stump well below ground level.

The foregoing and other objects and advantages will appear from the description to follow. In the description reference is made to the accompanying drawing, which forms a part hereof, and in which is shown by way of illustration, specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Figure 2:
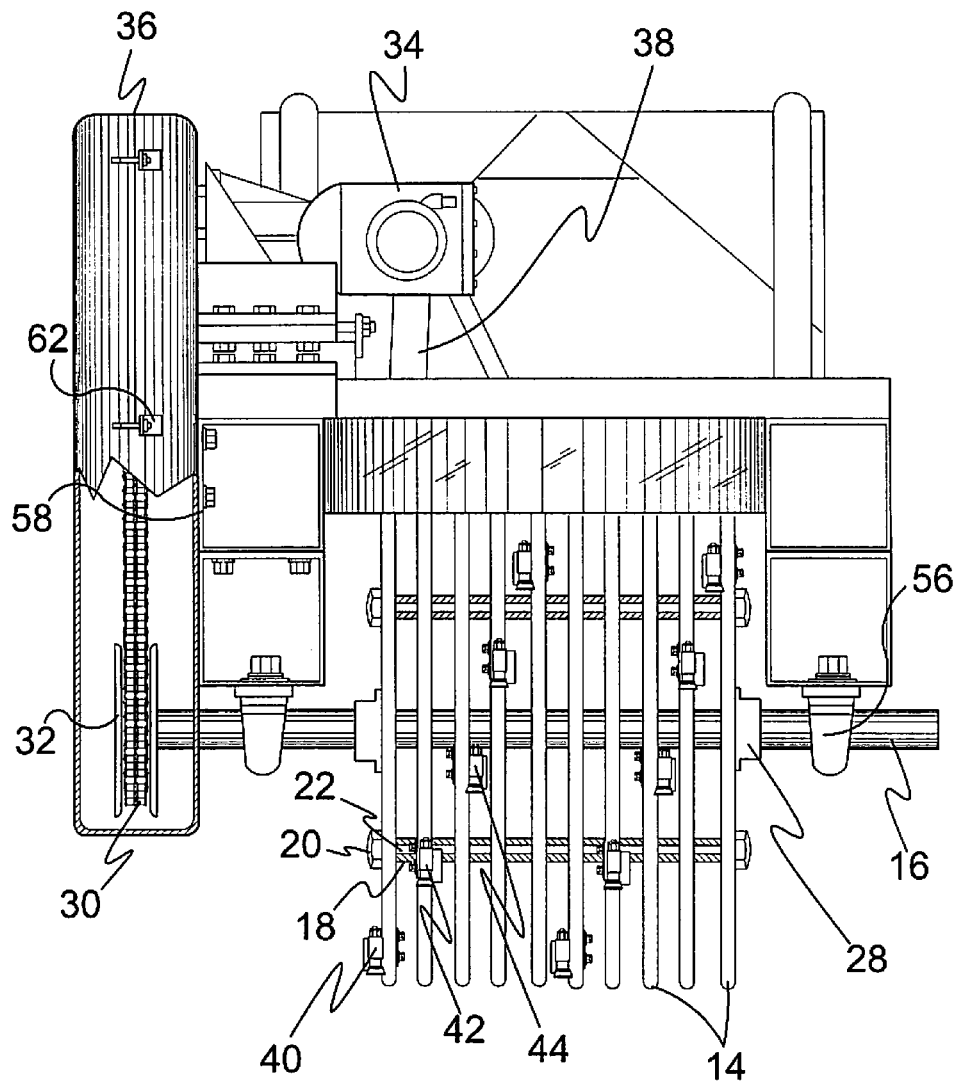
Figure 3:
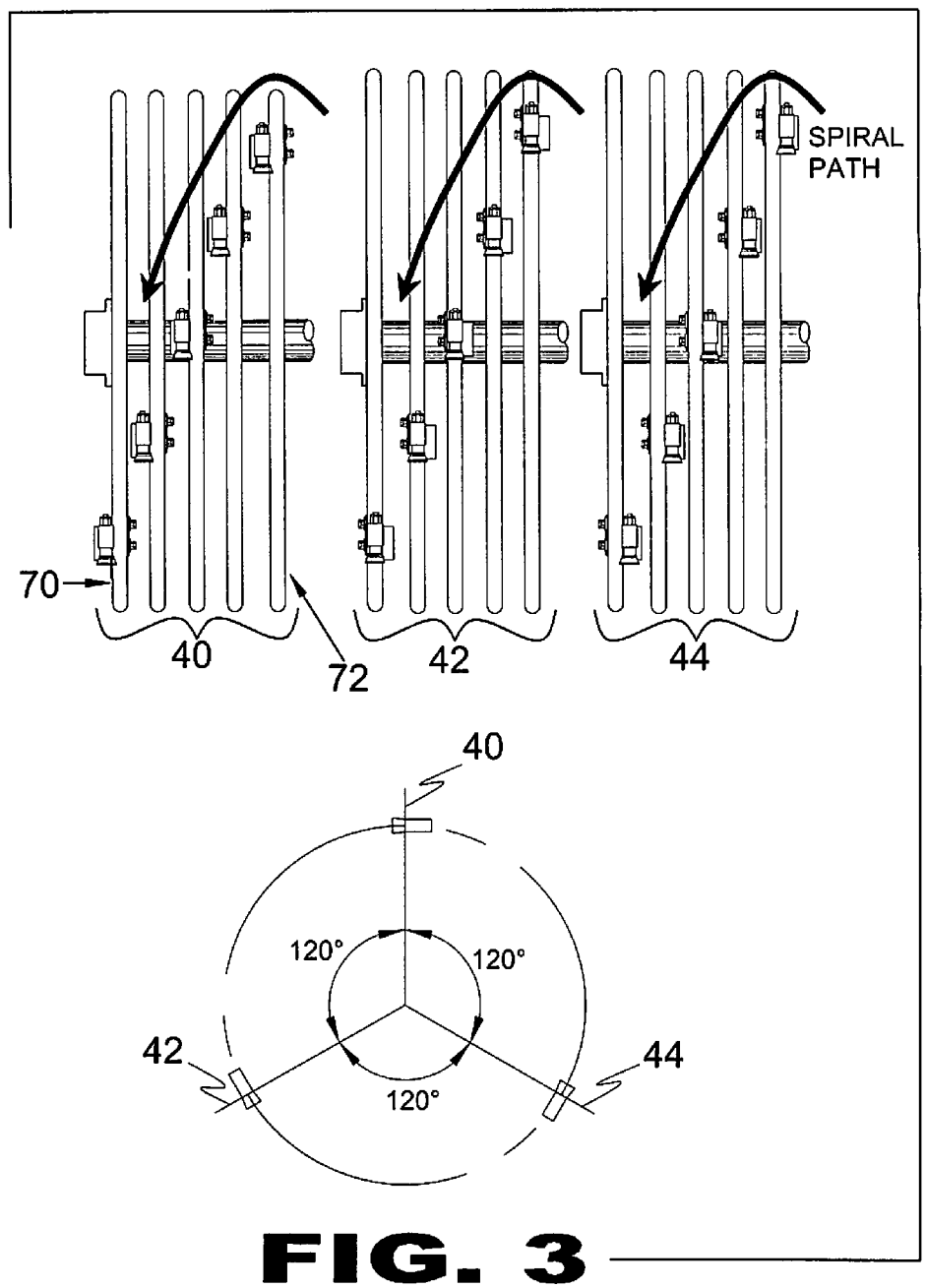
Figure 4:
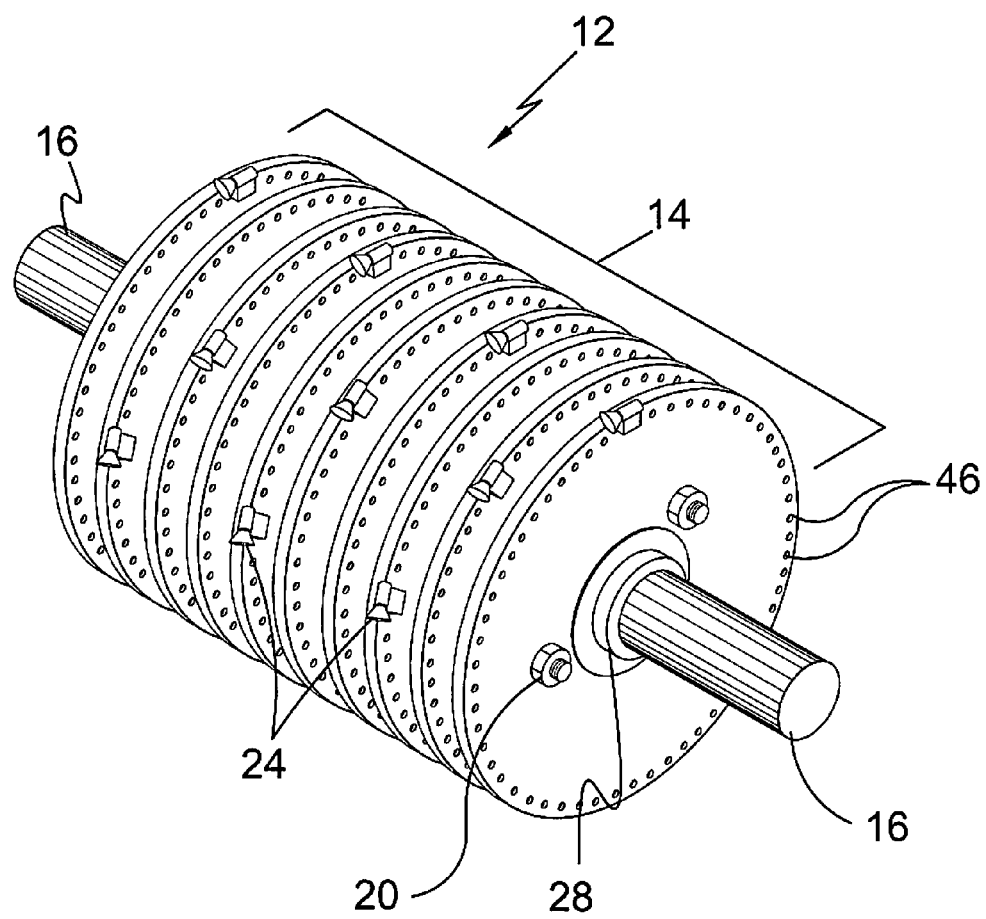
Figure 4A:
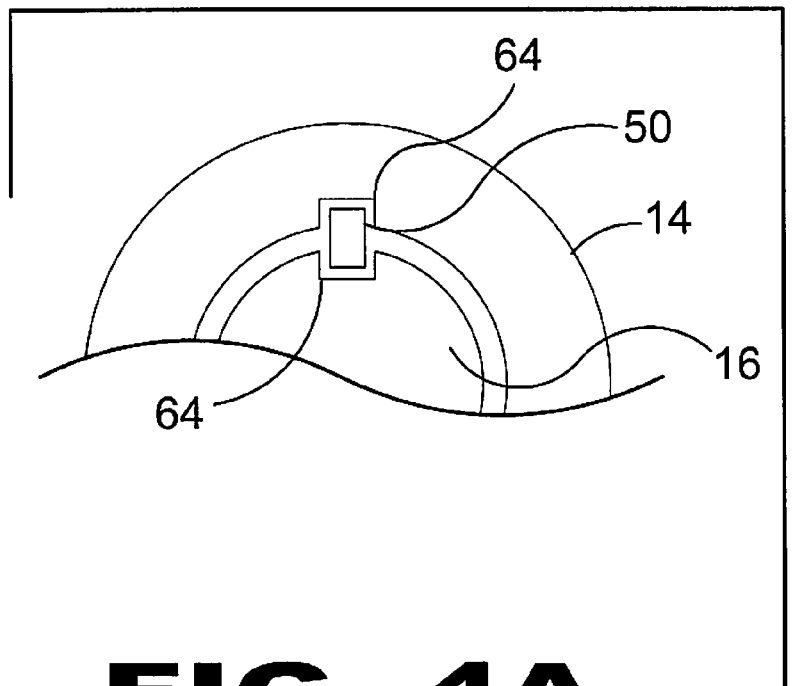
Figure 4B:
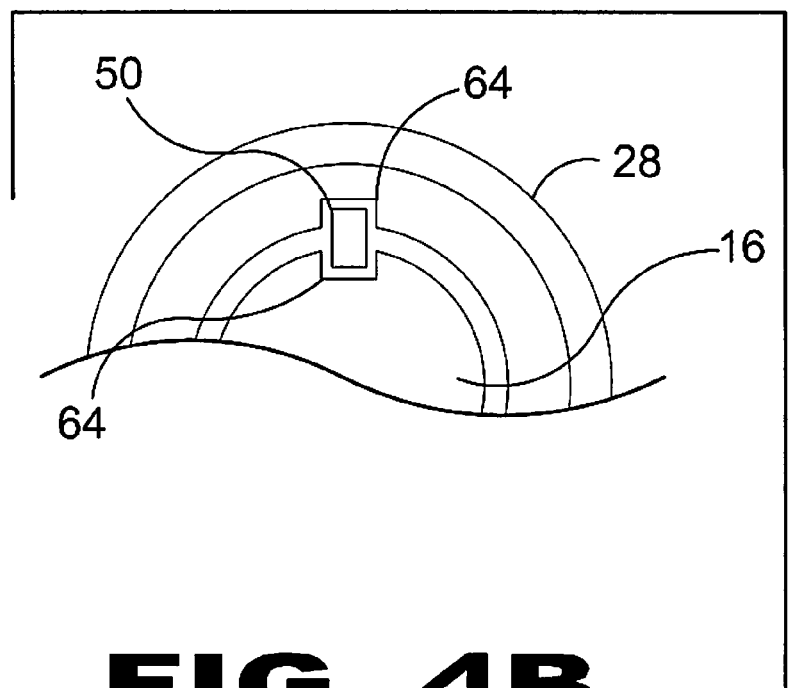
Figure 5:
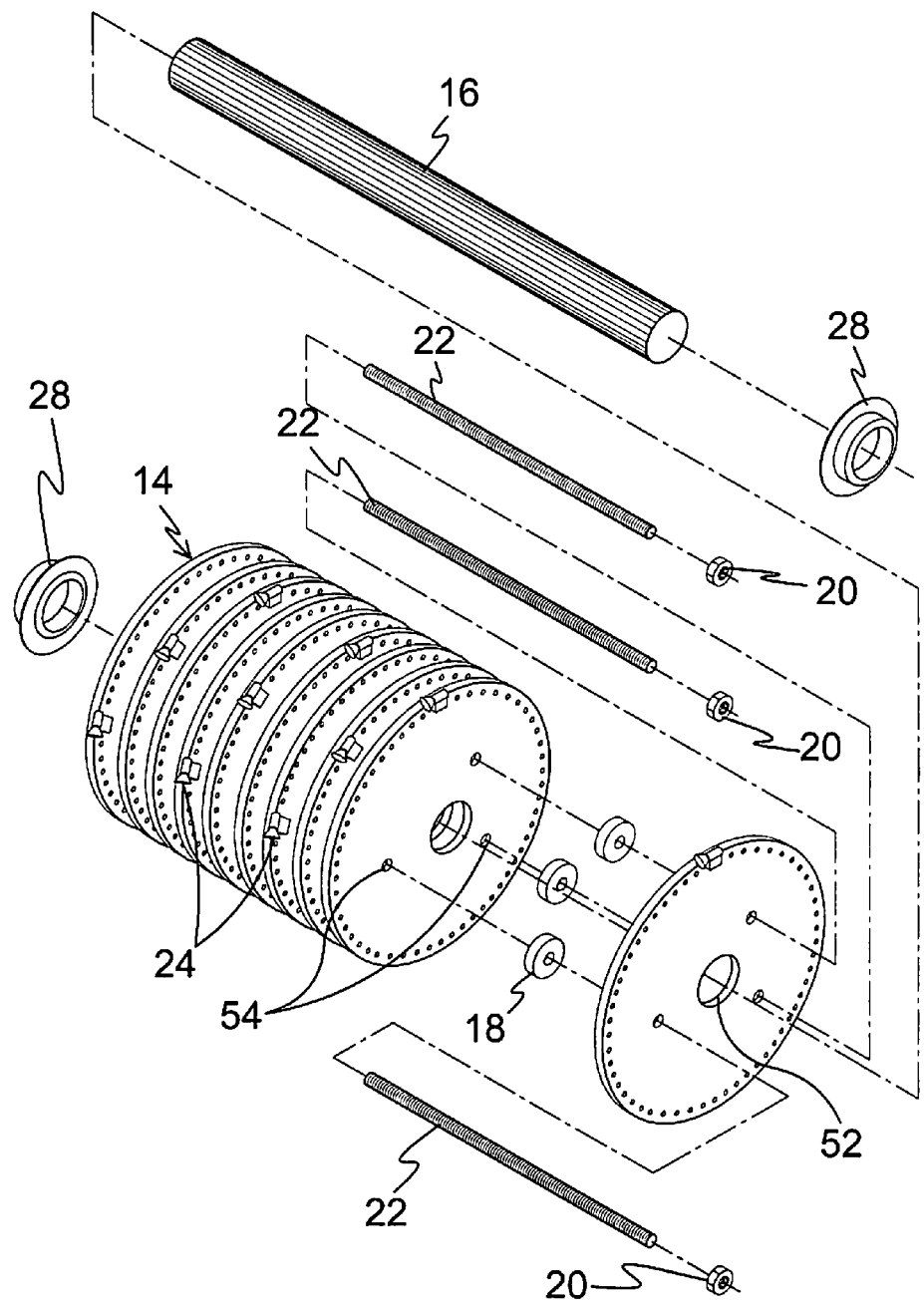
Figure 6:
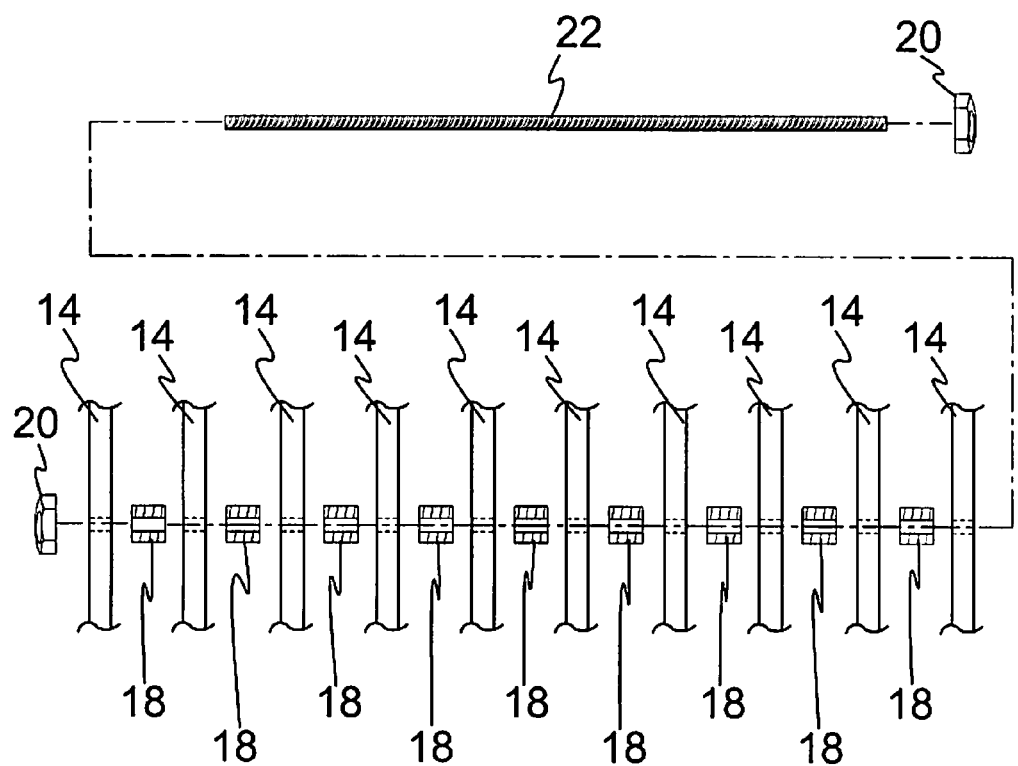
Figure 7:
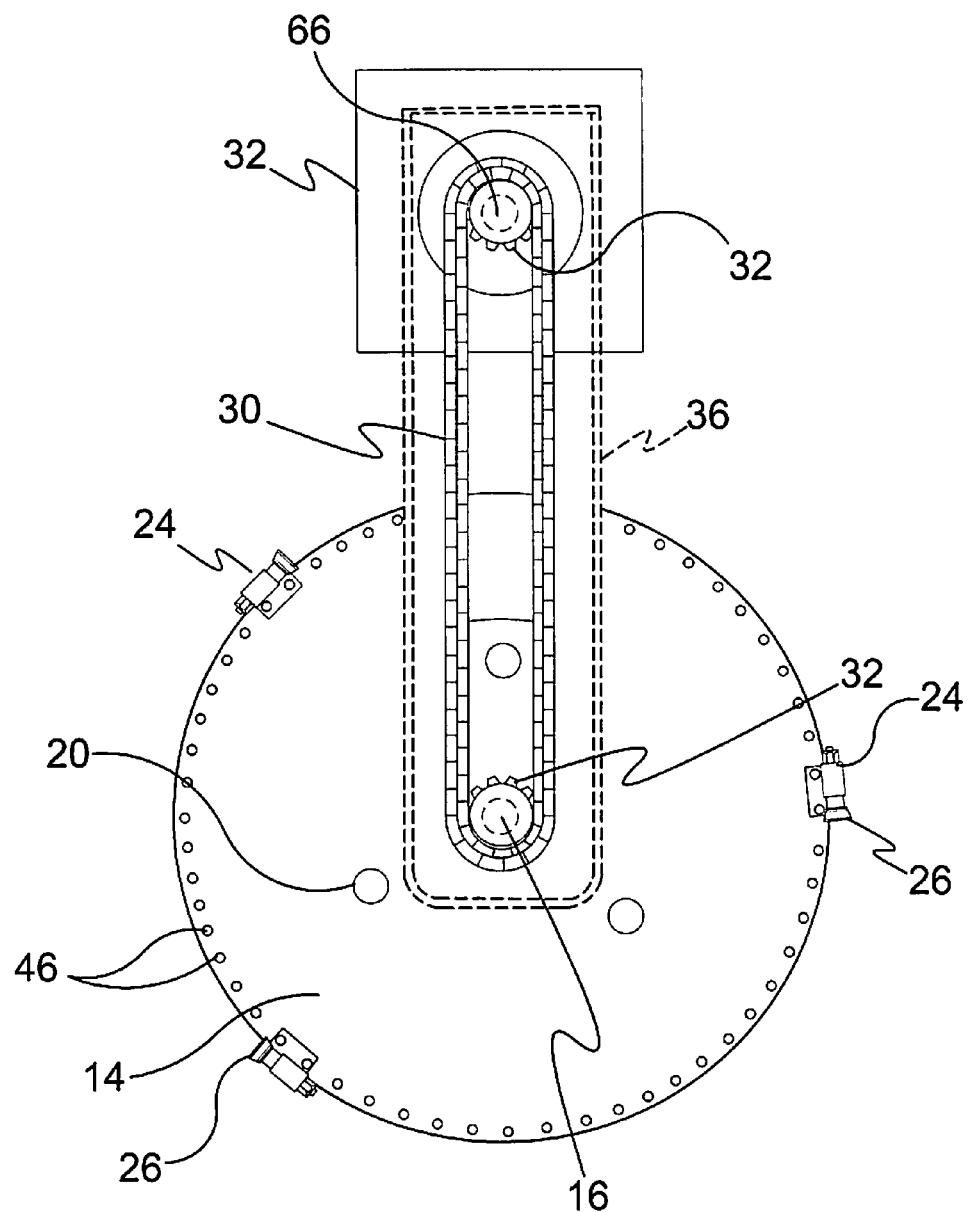
Figure 8:
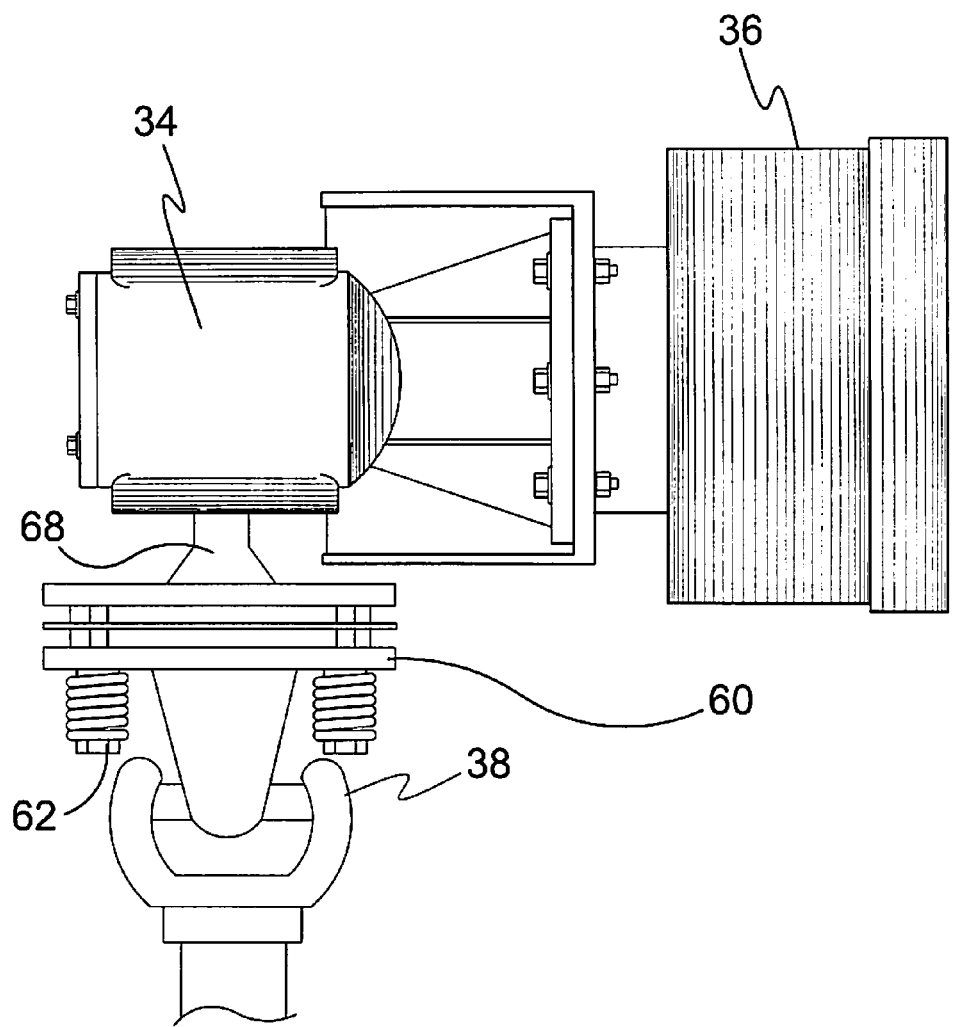
Figure 9:
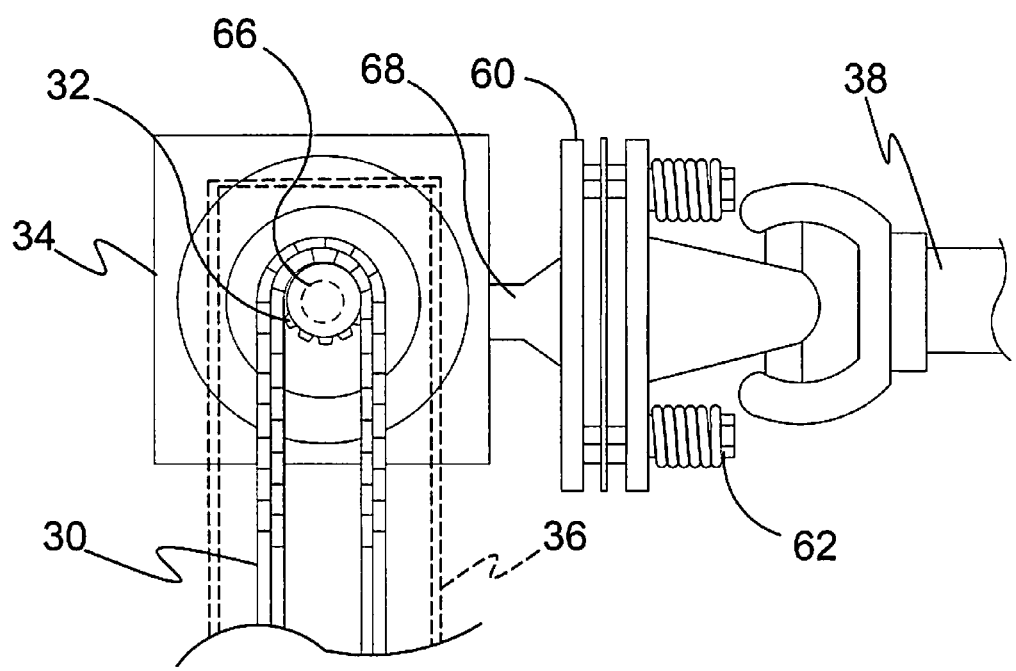

In order that the invention may be more fully understood, it will now be described, by way of example, with reference to the accompanying drawing in which:

FIG. 1 is an illustrative view of the present invention in use.
FIG. 2 is a frontal view of the present invention.
FIG. 3 is a frontal view of the present invention.
FIG. 4 is a perspective view of the present invention.
FIG. 4A is a partial section end view an additional element of the present invention.
FIG. 4B is a end view of an additional element of the present
FIG. 5 is an exploded view of the present invention.
FIG. 6 is a partial front exploded view of the present invention.
FIG. 7 is a side view of the present invention.
FIG. 8 is a top view of the present invention.
FIG. 9 is a side view of the present invention.

LIST OF REFERENCE NUMERALS

With regard to reference numerals used, the following numbering is used throughout the drawings.

10 Stump Grinder
12 Grinding Member
14 Plate
16 Shaft
18 Spacers
20 Nut
22 Stack Bolt
24 Cutting Element
26 Cutting Surface
28 Compression Coupler
30 Double Row Drive Chain
32 Double Sprocket
34 Right Angle Gearbox
36 Sprocket Cover
38 PTO Drive Shaft
40 First Side Cutting Element
42 Center Cutting Element
44 Second Side Cutting Element
46 Mounting Bolt Aperture
48 Mounting Bolts
50 Woodruff Key
52 Shaft Aperture
54 Stack Bolt Aperture
56 Shaft Support
58 Chassis
60 Disconnect Mechanism
62 Disconnect Fastener
64 Notch
66 Output Shaft
68 Input Shaft
70 First Surface
72 Second Surface

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 9 illustrate a stump grinder of the present invention which is indicated generally by the reference numeral 10.

FIG. 1, is an illustrative view of the stump grinder 10 of the present invention in use. The stump grinder 10 is driven (i.e. powered) by a power take off (PTO). The PTO may be on a tractor, truck, or any other suitable machine (not shown) with enough power to sufficiently drive the stump grinder. The grinding member 12 is made up of a plurality of plates 14 spaced apart and mounted on a round shaft 16. The grinding member 12 is attached to the chassis 58 of the stump grinder 10 with shaft supports 56. The supports allow the shaft 16 to freely rotate but limit lateral movement of the shaft 16. The plates 14 are held together in a stacked arrangement by at least three stack bolts 22. It is envisioned that additional stack bolts 22 may be employed to hold the plates 14 together such as but not limited to four stack bolts 22. The stack bolts 22 are shown where the shaft of each bolt is threaded from one end to the other. However, the bolt may only be treaded adjacent each end, so that each end is capable of accepting a nut 20. It is envisioned that the stack bolts may have a head formed on one end and the opposed end is threaded to accept a nut 18. The head eliminates the need for a second nut. The plates 14 have stack bolt apertures 54 disposed therein for accepting the stack bolts 22. Spacers 18 are provided between adjacent plates 14 so that each plate 14 is spaced from adjacent plates 14. The spacers 18 have stack bolt apertures 54 therein for accepting the stack bolts 22. The stack bolts 22 secure the plates 14 and the spacers 18 together in stack. Each plate 14 has three cutting elements 24 secured thereon. Each cutting element 24 is provided with at least one cutting surface 26 or portion. The cutting surface 26 may employ carbide or other suitable material so that it is durable and long lasting. The cutting elements 24 are secured to the plates 14 via mounting bolts 48. The cutting surface 26 of each cutting element 24 extends radially beyond the diameter of the plate 14 on which it is mounted. The each of the two outboard plates 14 in the stack is secured to the shaft 16 with a compression coupler 28. It is envisioned that the compression couplers 28 and the shaft 16 may each be provided with a notch 64 to accept a woodruff key 50. The woodruff key 50 provides a positive interlock between the shaft 16 and the compression couplers 28 to ensure that the couplers 28 do not rotate with respect to the shaft 16. The compression couplers 28 may be provided with protrusions that extend into apertures or openings in the outboard plates to provide a positive interlock between the couplers 28 and the outboard plates to ensure that the outboard plates to do not rotate with respect to the couplers 28 or the shaft 16. It is also envisioned that each of the plates 14 may be provided with a notch 64 to accept the woodruff key 52 to ensure a positive interlock between each of the plates 14 and the shaft 16. The plates 14 may be spaced several inches or more apart depending upon the width of the cutting elements 24. The plates 14 may be spaced so that each cutting element 24 has its own cutting path. The cutting path is the orbit that the cutting element 24 makes about the shaft 16 when the shaft 16 is rotated. The cutting path of adjacent cutting elements may slightly overlap each other, they may abut each other, or they may be spaced apart from each other. The spacing of the plates 14 reduces drag while grinding above and below ground level. The direction of the rotation enables the grinding member 12 to cut down trees, grind the stump well below ground level and mulch the entire tree with lower horsepower tractors.

FIG. 2, is a front view of the stump grinder 10 of the present invention. The stump grinder 10 has a grinding member 12 that may employ ten plates 14 spaced apart and mounted on a round shaft 16. The plates 14 are secured together by at least three stack bolts 22. If desired four stack bolts 22 could also be employed to secure the plates in the stack. It is preferable that the stack bolts 22 be spaced equidistant from adjacent stack bolts 22 although this is not required. They may be approximately equidistant to allow for manufacturing tolerances and to reduce production costs. For example, three stack bolts 22 would be spaced approximately 120 degrees apart and four stack bolts 22 would be spaced approximately 90 degrees apart. The shaft 16 is driven via a double row drive chain 30, a pair of double sprockets 32, a right angle gearbox 34, and a drive shaft from the PTO 38. One double sprocket 32 is secured adjacent one end of shaft 16. The other double sprocket 32 is mounted on the output shaft 66 of the right angle gearbox 34. The stump grinder 10 may employ a clutch (not shown) to allow the user to start and stop the machine without stopping the PTO drive shaft 38. The clutch would be positioned in the drive system between the drive shaft (from the PTO) and the shaft 16.

FIG. 3, is a partial front view of the grinding member 12 of the present invention. Shown is the configuration for the cutting elements 24 in three different illustrations of part of the same grinding member 12. Each plate 14 has three cutting elements 24 positioned thereon. The three cutting elements 24 of each plate 14 as distributed as follows: one is positioned as a first side cutting element 40, one is positioned as a center cutting element 42, and one is positioned as a second side cutting element 44. The location of each cutting element 24 is illustrated in this Figure. The first side cutting elements 40 are positioned on and extend laterally outwardly from a first side of their respective plate 14. The left most illustration shows only the only the first side cutting elements 40 for clarity. The second side cutting elements are positioned on and extend laterally outwardly from a second and opposite side of their respective plates. The right most illustration shows only the second side cutting elements 46 for clarity. The center cutting elements are positioned so that they are laterally intermediate (i.e. in between) of their respective first side and second side cutting elements. The center cutting elements are secured to one side of the plate. The center cutting elements are formed so that the cutting portion of each element is positioned laterally intermediate the cutting portions of the right and left cutting elements. The center cutting elements may be formed so each cutting portion is aligned with the edge of its respective plate as seen in FIG. 3. The center illustration shows only the center cutting elements 42 for clarity. The first and second side cutting elements may be formed so that at least part of their respective cutting surface 26 extends laterally outwardly beyond the respective surface on which they are mounted. This is shown clearly in this Figure. It may be desired to have a small part of the cutting surface extend laterally inward beyond the respective surface on which they are mounted (seen in this Figure). This will ensure that there is lateral overlap between the cutting elements 24 of a single plate 14. The overlap becomes apparent when viewing the cutting surface 26 of the different cutting elements 24 shown in FIG. 3. The width of the cutting surface 26 of each center cutting elements 42 is shown as being wider than the width of their respective plates 14. The cutting surface 26 of each first side cutting element 40 is shown as extending laterally inwardly beyond the first surface 70 toward the second surface 72. The cutting surface 26 of each second side cutting element 46 is shown as extending laterally inwardly beyond the second surface 72 toward the first surface 70. Thus the overlap between the cutting surfaces 26 becomes clear. The width of the center cutting surface 26 need not be wider than the thickness of the plate 14 and it may be the same thickness as the plate 14 or thinner. It is preferred that the cutting surfaces overlap laterally although it is not required. It is envisioned that the cutting surface 26 of the cutting elements 24 of a single plate 14 may be laterally spaced from each other to reduce drag when the grinding member 12 is rotating. The cutting elements 24 of a single plate 14 are circumferentially spaced from each other as seen in this Figure. They are shown with a spacing of approximately one hundred-twenty degrees. It is preferred that they are spaced equidistant although they do not have to be perfectly equidistant. The spacing may be approximately one hundred-twenty degrees to allow for manufacturing tolerances and to reduce production costs. It should be noted that the cutting elements 24 of one group, (i.e. first, center, or second) form what is akin to a spiral path around and across the face of the grinding member 12 due to the lateral spacing of the plates 14 and the circumferential spacing or staggering of the cutting elements 24 of a particular group (i.e. first, center, or second). The circumferential spacing between the first and last cutting element 24 of a group (first, center, second) is preferably limited to one hundred-twenty degrees. When employed for all groups, the limit (120 degree) ensures that there is minimal overlap between groups. When the spacing of each group is substantially less than one hundred-twenty degrees there will be a gap between groups. The gaps allow one group to complete a portion of its cutting path before another group engages the stump. As previously noted a grinding member may have less than 10 plates 14. When the grinding member has a total of five plates, each group of cutting elements 24 (first, right and center) has exactly five cutting elements. The maximum spacing between adjacent cutting elements 24 of the same group would be thirty degrees so that the one hundred-twenty degree limit is not exceeded. In each group of five cutting elements 24 there are four spaces or gaps and one hundred-twenty degrees divided by four which equals thirty degrees. This is the maximum that the cutting of a group could be spaced apart without exceeding the one hundred-twenty degree limit. The adjacent cutting elements 24 of a single group may be spaced less than the thirty degrees. They may be spaced as little as a few degrees apart. When adjacent cutting elements 24 of the same group as spaced further apart circumferentially (i.e. a great number of degrees), the drag on the grinding element is reduced and ultimately the load on the PTO is reduced as well. The load is reduced since the circumferential spacing ensures that all the cutting elements 24 of a single group are not in contact with the stump at the same time.

FIG. 4, a perspective view of stump grinder 10 of the present invention. The grinding element 12 is shown with ten plates 14 spaced apart and mounted on a round shaft 16. The grinding element 12 may employ less than ten plates. It is envisioned that the grinding element 12 may employ any number of plates 14 between two and ten. The greater number of plates 14 provides a wider grinding element 12. The wider the grinding element 12 the quicker the stump will be ground since the stump can be ground with fewer passes than with a narrow grinding element 12. Three stack bolts 22 secure the stack of plates 14 together, though only two stack bolts 22 are visible since one is hidden by shaft 16. The stack bolts 22 extend through a stack bolt aperture 54 in each spacer 18. The plates 14 and spacers 18 are held together by a nut 20 secured on each end of the stack bolts 22. Three cutting elements 24 are mounted by bolt 22 to each plate 12 extending outside the diameter of the plate 12. The two outboard plates are secured to the shaft 16 with compression couplers 28. This figure shows an alternative distribution of the cutting elements 24. The only cutting elements 24 shown are second side cutting elements 44 that are secured to the second or right side of each plate 14. The cutting elements 24 are set in three rows where the cutting elements in a single row are approximately laterally aligned. The angular separation between the first and the last row is preferably approximately one hundred-twenty degrees or less. The angular separation between the first and the last row may be as small as approximately thirty degrees. The separation will be limited or determined by the mounting holes in each plate and how far apart they are spaced from one and other. For example, when each plate has sixty mounting apertures 46, adjacent apertures 46 or holes will be separated by 6 degrees when the holes are perfectly equidistant from each other. The spacing does not have to be perfectly equidistant and may allow for manufacturing tolerances to reduce production cost. The angular distance between the first and last row of cutting elements seen in this Figure is less than ninety degrees. The direction of the rotation enables the grinding member 12 to cut down trees, grind the stump well below ground level and mulch the entire tree with lower horsepower tractors.

FIGS. 4A and 4B show an additional element of the present invention. The plates 14, the shaft 16, and the compression couplers 28 may each have a notch 64 to accept a woodruff key 50. FIG. 4A illustrates the woodruff key 50 in place between the notches 64 on the shaft 16 and the plate 14. The notches are aligned to create a slot. FIG. 4A illustrates the woodruff key 50 in place between the shaft 16 and the compression coupler 28. When the woodruff key 50 is installed it prevents rotation between the plate 14 and the axle 16 and the coupler 28 and the axle 16.

FIG. 5 is an exploded view of the grinding element of the present invention. The grinding member 12 has ten plates 14 secured together in a stack by three stack bolts 22. Spacers 18 separate adjacent plates. Each spacer 18 has a stack bolt aperture 54 for receiving one of the stack bolts 22. The bolts 22 are shown with the shaft of each bolt is threaded from one end to the other. The stack bolts 22 are essentially threaded rods where the entire rod is threaded. An alternative is to thread the bolts 22 adjacent each end so that each end is capable of receiving a nut 20. Each of the plates 14 has a centrally disposed shaft aperture 52 for receiving the shaft 16. The stack bolt apertures 54 are preferably spaced approximately one hundred-twenty degrees apart. The stack bolt apertures 54 need not be exactly one hundred-twenty degrees apart to allow for manufacturing tolerances. For clarity, each plate 14 is shown as having only one cutting element 24. However each plate 14 will have three cutting elements 24. Each cutting element 24 is mounted to the plate with mounting bolts 22 that extend through the mounting apertures 46.

The cutting elements 24 are secured to the plate 14 so that the cutting portion 26 extends radially outwardly beyond the diameter of the plate 14 on which it is mounted. The two outboard plates are secured to the shaft 16 with compression couplings 24. The plates 14, couplers 28, and the shaft 16 may each be provided with a notch 64 for accepting a woodruff key 50 to prevent rotation between the shaft 16 and the plates 14 and the shaft 16 and the couplers 28.

FIG. 6, a partial exploded view of the grinding member 12 of the stump grinder 10 of the present invention. Shown is a portion of each of the ten plates 14 that form the grinding member 12. The spacers 18 separate adjacent plates 14. Typically all the spacers 18 employed in the grinding element 12 will have the same width or thickness. Spacers 18 with different widths may be provided to allow a user to vary the spacing between plates 14. The width of the spacers 18 would be increased in order to reduce drag on the grinding element 12. Each of the spacers 18 has a stack bolt aperture 54 formed therein for receiving a stack bolt 22 there through. It is envisioned that the plates 14 may be spaced two or more inches apart from each other. When the plates 14 are spaced two or more inches apart the drag is reduced while grinding above and below ground level. The bolts 22 pass through the apertures 54 in the plates 14 to secure the plates 14 and the spacers 18 in a stack. A nut 20 is secured to each end of the bolt 22 to hold the stack of plates 14 and spacers 18 together.

FIG. 7, a side view of the stump grinder 10 of the present invention. The drive mechanism of the present invention 10 is shown. The right angle gearbox 34 transfers power from the power take off (PTO) of a tractor, other suitable machine or vehicle. The PTO drive shaft 38 is connected to the input shaft 68 of the right angle gearbox 34. The Right angle gearbox 34 is provided with an output shaft 66. The output shaft 66 of the gearbox has a double sprocket 32 secured thereon for mating with the double row drive chain 30. The rotation of the PTO drive shaft 38 causes the output shaft 66 of gearbox 34 to rotate. The transfer of rotation and power from the input shaft 66 to the output shaft 68 is achieved via a plurality of gears located within the gearbox 34, where one of which is joined or secured to the output shaft 66 and one is secured to the input shaft 68. Each double sprocket 32 has two sets teeth disposed thereon where each set includes a plurality of teeth circumferentially disposed about the periphery of the sprocket. The teeth of a single set are for engaging one of the two rows of the drive chain 30. The sets of teeth are laterally spaced apart to match up with the two rows of the drive chain 30. The double sprocket 32 and double row drive chain 30 effectively reduce the torque load on a single set of teeth and a single row of the drive chain 30 to one half of the total load. The double row drive chain 30 is secured over both of the double sprockets 32. The second double sprocket 32 is joined to the shaft 16 of the grinding element 12. As the output shaft 66 of the right angle gearbox 34 rotates, the double sprocket 32 mounted thereon rotates and causes the double row drive chain 30 to advance. As the double row drive chain 30 advances the double sprocket 32 on shaft 16 is driven by the drive chain 30. As the sprocket 32 rotates the attached shaft 16 and grinding member 12 rotate as well. The sprocket cover 36 encloses the drive chain 30 the two double sprockets 32 to protect a user from contacting the moving mechanism. The sprocket cover 32 is shown as having two mating parts joined by a plurality of fasteners. The cover may employ more than two parts and may be configured to have at least one fastener. A first one of the two parts is secured to the chassis 58 of the stump grinder 10 and the second one is secured to the first part by one or more fasteners.

FIG. 8, a top view of the stump grinder 10 of the present invention. Shown is the PTO drive shaft 38 that is connected to the right angle gearbox 34. The double row drive chain 30 and the two double sprockets 32 are not seen in this Figure since the sprocket cover 36 encloses them. The PTO drive shaft 38 is secured to and interlocks with the input shaft 68 of the gearbox 34. Power is transferred from the input shaft 68 to the output shaft 66 though a plurality of internal gear within the gearbox 34. It is envisioned that a disconnect mechanism 60 will be provided on the end of the input shaft 68 to allow the user to quickly connect or disconnect the PTO drive shaft 38 from the input shaft 68 of the gearbox 34. The disconnect mechanism 60 quickly and efficiently interlocks the PTO drive shaft 38 with the input shaft 68 of the gearbox 34.

FIG. 9, is a side view of part of the drive train of the stump grinder 10 of the present invention. The sprocket cover 36 is shown in phantom so that part of the double row drive chain 30 and the double sprocket 32 on the output shaft 66 of the gearbox 34 are visible. The PTO drive shaft 38 and the disconnect mechanism 60 are also seen. The disconnect mechanism 60 interlocks the PTO drive shaft 38 with the input shaft 68 of the gearbox 34. The disconnect mechanism 60 employs a plurality of fasteners 62 to interlock the two mating parts, one of which is secured to the input shaft 68 and the other which is secured to the PTO drive shaft 38.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A stump grinder capable of being powered by a power take off, the stump grinder comprising:
    a plurality of plates mounted on a shaft that is capable of being driven by the power take off;
    said plates being joined together in a spaced apart and stacked relationship by at least two bolts;
    wherein each of said plates has three cutting elements secured thereon and each of the cutting element is adjacent the periphery of its respective plate;
    wherein the cutting elements are mounted on their respective plates such that the cutting elements are spaced apart from each other circumferentially about the plate;
    wherein each cutting element has a cutting portion disposed thereon and the cutting portion of a first cutting element of a first plate is at least partially spaced laterally outwardly from a first surface of said first plate, a second cutting element of the first plate is at least partially spaced laterally outwardly from a second surface of said first plate;
    wherein the power take off will feed power through a right angle gearbox when the stump grinder is connected to the power take off; and
    wherein the right angle gearbox is connected to a first double sprocket that drives a double row chain drive.

2. The stump grinder of claim 1, wherein the shaft is supported by two shaft supports which allow the shaft to freely rotate but limit the lateral travel of the shaft.

3. The stump grinder of claim 1, wherein the double row drive chain drives a second double sprocket mounted adjacent one end of the shaft.

4. The stump grinder of claim 1, wherein the plates are secured to the shaft by a plurality of compression coupler and at least one woodruff key.

5. The stump grinder of claim 1, wherein each of the plates has a plurality of mounting apertures formed therein which are circumferentially disposed about and adjacent the periphery.

6. The stump grinder of claim 5, wherein the each cutting element is secured with a plurality of fasteners, each of said fasteners extends through one of said mounting apertures.

7. The stump grinder of claim 6, wherein each of said fasteners is removable and replaceable.

8. The stump grinder of claim 7, wherein each of the fasteners has a head and a threaded shaft,
    wherein each of the cutting elements has two threaded apertures disposed therein and each threaded apertures has a threaded shaft disposed therein.

9. The stump grinder of claim 3, wherein the first and second double sprockets and the double row drive chain are all housed within a protective cover that prevents a user from coming in contact with moving chain and the double sprockets.

10. The stump grinder of claim 1, wherein the cutting portion of a third cutting element of said first plate is laterally intermediate said first and second cutting elements.

11. The stump grinder of claim 1, wherein each end of each bolt is secured with a nut.

12. The stump grinder of claim 1, wherein the cutting elements of a single plate are spaced approximately 120 degrees apart from each other.

13. The stump grinder of claim 10, wherein the cutting portion of said third cutting element is aligned with a circumferential face of said first plate.

14. The stump grinder of claim 13, wherein each of the plates has a plurality of mounting apertures formed therein which are circumferentially disposed about and adjacent the periphery.

15. The stump grinder of claim 14, wherein the each cutting element is secured with a plurality of fasteners, each of said fasteners extends through one of said mounting apertures.

16. The stump grinder of claim 9, wherein the protective cover has two portions, a first portion secured to a chassis of the stump grinder and a second portion that mates with the and is secured to the first portion.

17. The stump grinder of claim 16, the second portion of the protective cover is removed from the first portion to gain access to the double row drive chain and the two double sprockets.

18. The stump grinder of claim 17, wherein a disconnect mechanism is provided on the input shaft of the right angle gear box and is capable of connecting to the power take off.

* * * * *